United States Patent
La et al.

(10) Patent No.: US 8,420,943 B1
(45) Date of Patent: Apr. 16, 2013

(54) WIRING GROMMET WITH BODY CONTACT PORTION

(75) Inventors: Tuan La, Canton, MI (US); Bert Weinert, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 48 days.

(21) Appl. No.: 13/299,660

(22) Filed: Nov. 18, 2011

(51) Int. Cl.
*H01B 17/58* (2006.01)

(52) U.S. Cl.
USPC ............ 174/152 G; 174/650; 174/153 G; 174/659; 174/153; 248/56; 16/2.1; 439/604

(58) Field of Classification Search .......... 174/650, 174/153 G, 152 G, 659, 153; 248/56; 16/2.1, 16/2.2; 439/604, 587; 277/606
See application file for complete search history.

(56) References Cited

U.S. PATENT DOCUMENTS

| | | | |
|---|---|---|---|
| 4,970,351 A | 11/1990 | Kirlin | |
| 5,777,274 A | 7/1998 | Kawase | |
| 6,395,986 B1 * | 5/2002 | Gust et al. | 174/650 |
| 7,423,223 B2 * | 9/2008 | Taira | 174/650 |
| 7,868,256 B2 | 1/2011 | Suzuki | |
| 7,943,854 B1 * | 5/2011 | Lipp | 174/152 G |
| 7,952,032 B2 | 5/2011 | Suzuki | |

FOREIGN PATENT DOCUMENTS

| | | |
|---|---|---|
| EP | 735547 A1 | 2/1996 |
| JP | 9320371 A | 12/1997 |
| JP | 10297389 A | 11/1998 |
| JP | 2000217229 A | 8/2000 |
| JP | 2001132871 A | 5/2001 |
| JP | 2003087945 A | 3/2003 |
| JP | 2007185067 A | 7/2007 |
| WO | 2008041378 A1 | 4/2008 |

* cited by examiner

Primary Examiner — Dhirubhai R Patel
(74) Attorney, Agent, or Firm — Young, Basile, Hanlon & MacFarlane, P.C.

(57) ABSTRACT

Disclosed herein are embodiments of an electrical wiring grommet. In one aspect, an electrical wiring grommet includes a body mounting portion, a closure panel mounting portion and a flexible conduit portion extending between the body mounting portion and the closure panel mounting portion. The flexible conduit portion includes a longitudinally extending body contact segment having a circumference, the circumference having a first circumferential portion and a second circumferential portion. The first circumferential portion includes a corrugated surface having a plurality of ridges with a first ridge height, and the second circumferential portion includes a corrugated surface having a plurality of ridges with a second ridge height less than the first ridge height.

20 Claims, 5 Drawing Sheets

WIRING GROMMET WITH BODY CONTACT PORTION

TECHNICAL FIELD

The embodiments disclosed herein relate to an electrical wiring grommet and in particular to an electrical wiring grommet for attachment to a moveable vehicle body panel.

BACKGROUND

Electrical wiring grommets are used to provide a passageway for electrical wires that span between vehicle body panels. If one vehicle body panel is moveable with respect to another, a portion of the grommet attached between the body panels can be constructed from a flexible material to allow the grommet to bend as one or more of the body panels are moved. However, as the grommet bends, it may interfere with the body panels or with other parts of the vehicle body. This interference can cause the grommet to catch on the vehicle body and can cause wear to the grommet. Therefore, there is a need for an electrical wiring grommet that includes a body contact portion that will not catch on a vehicle body and that increases the durability of the grommet while maintaining its flexibility.

SUMMARY

Disclosed herein are embodiments of an electrical wiring grommet. In one aspect, an electrical wiring grommet comprises a body mounting portion, a closure panel mounting portion and a flexible conduit portion extending between the body mounting portion and the closure panel mounting portion. The flexible conduit portion comprises a longitudinally extending body contact segment having a circumference, the circumference having a first circumferential portion and a second circumferential portion. The first circumferential portion includes a corrugated surface having a plurality of ridges with a first ridge height, and the second circumferential portion includes a corrugated surface having a plurality of ridges with a second ridge height less than the first ridge height.

In another aspect, an electrical wiring grommet is included in an electrical wiring pass-through structure for a vehicle. The electrical wiring pass-through structure comprises a body panel defining a body panel pass through aperture and a closure panel defining a closure panel pass-through aperture. The electrical wiring grommet comprises a body mounting portion overlaying the body panel pass through aperture, a closure panel mounting portion overlaying the closure panel pass through aperture and a flexible conduit portion extending between the body mounting portion and the closure panel mounting portion. The flexible conduit portion comprises a longitudinally extending body contact segment having a circumference that has a first circumferential portion and a second circumferential portion. The first circumferential portion includes a corrugated surface having a plurality of ridges with a first ridge height, and the second circumferential portion includes a corrugated surface having a plurality of ridges with a second ridge height less than the first ridge height.

In yet another aspect, an electrical wiring grommet comprises a body mounting portion, a closure panel mounting portion and a flexible conduit extending between the body mounting portion and the closure panel mounting portion. The flexible conduit has a circumference and comprises a longitudinally extending body contact portion extending along a partial length of the flexible conduit and 180° or less of the circumference. The flexible conduit includes a plurality of alternating ridges and valleys forming a corrugated surface, and the body contact portion is substantially flat along a longitudinal direction of the flexible conduit.

BRIEF DESCRIPTION OF THE DRAWINGS

The various features, advantages and other uses of the present apparatus will become more apparent by referring to the following detailed description and drawing in which.

DETAILED DESCRIPTION

Figure 1:
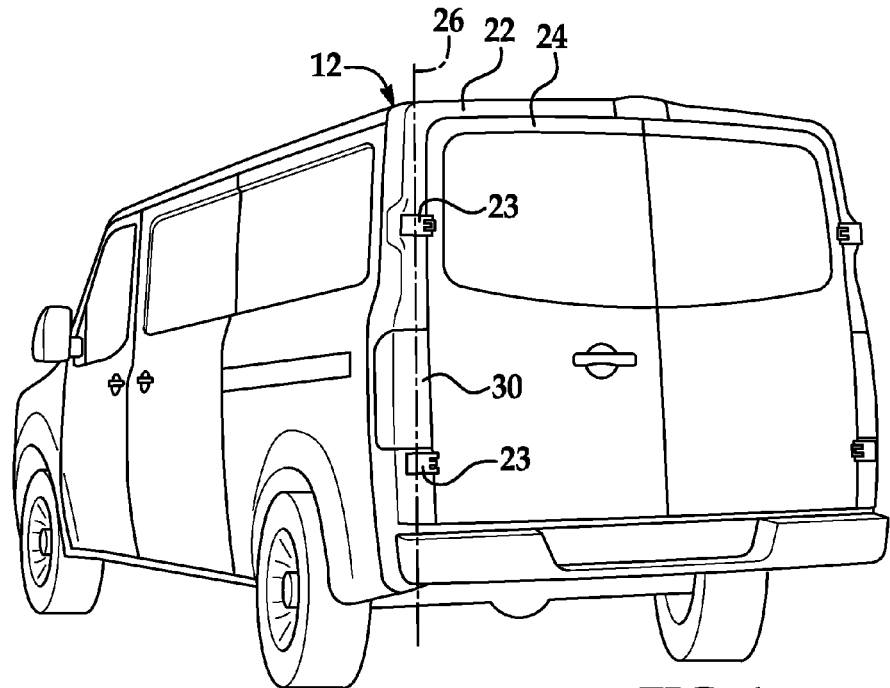
FIG. 1 is a perspective view of a rear of a vehicle with a closure panel in a closed position.
Figure 2:
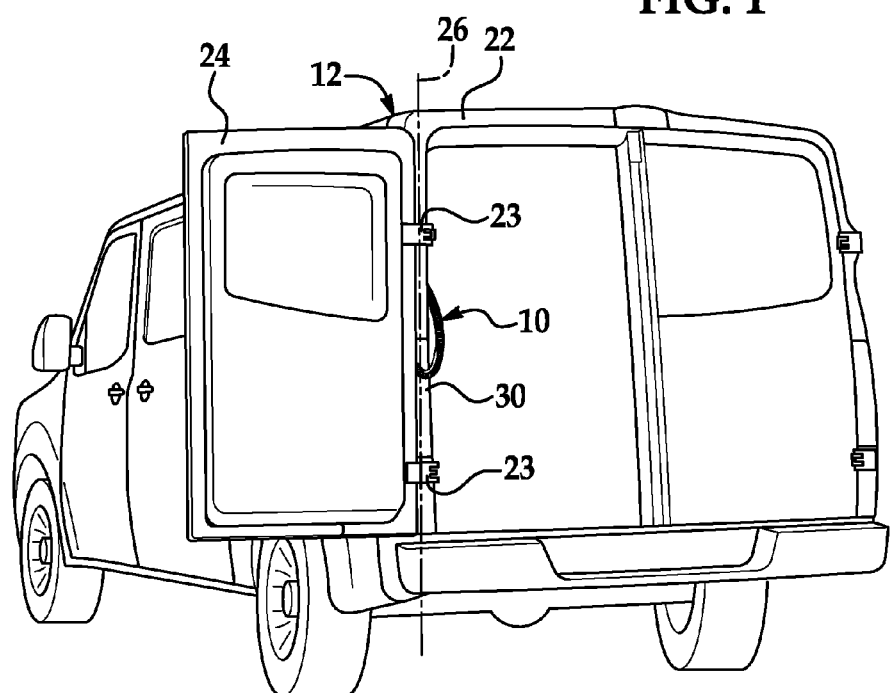
FIG. 2 is a perspective view of a rear of a vehicle with a closure panel in an open position.
Figure 3:
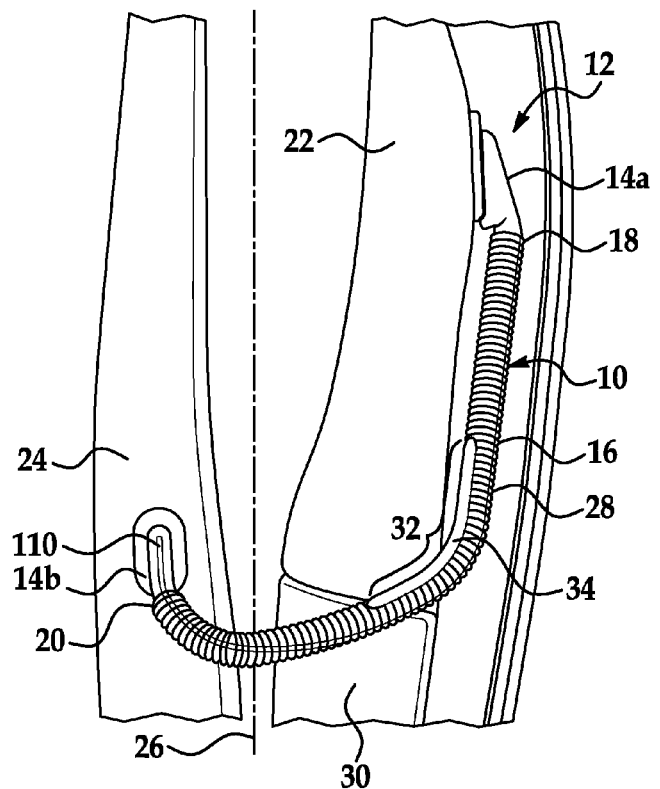
FIG. 3 is an enlarged perspective view of an electrical wiring grommet attached between vehicle body panels.

FIGS. 1-3 show an electrical wiring grommet 10 configured for attachment between panels 22 and 24 of a vehicle 12. The grommet 10 can be attached between panels 22 and 24 that are configured for movement relative to one another. For example, as shown in FIGS. 1-3, the panel 22 is a body panel fixed to the vehicle 12, and the panel 24 is a closure panel, illustrated as a rear door of the vehicle 12, that can rotate about a vertical axis 26 between a closed position (shown in FIG. 1) and an open position (shown in FIGS. 2 and 3). In the open position, the closure panel 24 can be rotated approximately 180° from the closed position, as shown in FIG. 2, or rotated approximately 270° from the closed position, as shown in FIG. 3, although the closure panel 24 could alternatively be configured to rotate to 90°, 225° or any other suitable amount from the closed position. The closure panel 24 can be rotatably coupled to the vehicle 12 adjacent to the body panel 22 through, for example, one or more hinges 23. The movement between the body panel 22 and the closure panel 24 by rotation of the closure panel 24 relative to a fixed body panel 22 is illustrated by way of example only. The body panel 22 and the closure panel 24 could alternatively be configured to move vertically, horizontally or in any other direction or orientation with respect to each other. In addition, although the panel 22 is illustrated as a body panel and the closure panel 24 is illustrated as a door, the panels 22 and 24 could be any panels included in the vehicle 12 configured for movement relative to one another.

As shown in FIG. 3, the grommet 10 includes a body mounting portion 14a, a closure panel mounting portion 14b and a flexible conduit portion 16. The flexible conduit portion 16 is tubular and extends between the body mounting portion 14a and the closure panel mounting portion 14b, with a first end 18 of the flexible conduit portion 16 formed continuously with the body mounting portion 14a and a second end 20 of the flexible conduit portion 16 formed continuously with the closure panel mounting portion 14b. The body mounting portion 14a of the grommet 10 is configured for attachment to a body panel 22, and the closure panel mounting portion 14b is configured for attachment to a closure panel 24.

Figure 4:
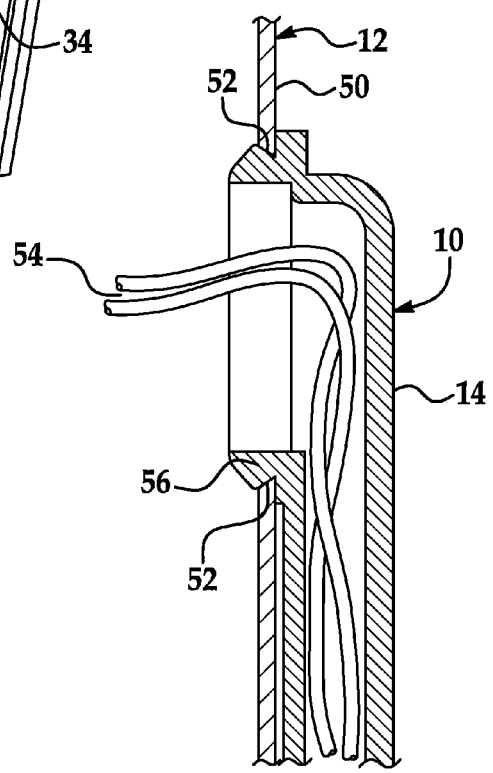
FIG. 4 is a section view of a wiring grommet mounting portion attached to a body panel.

The attachment of a mounting portion 14 (14a or 14b) to an exemplary panel 50 (22 or 24) of the vehicle 12 is illustrated in FIG. 4. The panel 50 defines a pass through aperture 52 to allow one or more components included in the vehicle 12, such as electrical wiring 54, to pass through the panel 50. The mounting portion 14 overlays the pass through aperture 52 and includes an annular flange 56 press fit into the pass through aperture 52 to provide a sealed attachment between the flange 56 and the panel 50. The mounting portion 14 can alternatively be adhered, snap fit, friction fit, fastened or otherwise attached to the panel 50.

As illustrated in FIG. 3, the grommet 10 can be included in a pass-through structure for the vehicle 12. The vehicle 12 can include a body panel 22 and a closure panel 24 that are moveable relative to one another, for example, and the grommet 10 can be attached between the body panel 22 and the closure panel 24 to provide an enclosed passageway for the wiring of vehicle components between a closed position of the closure panel 24 and a fully open position of the closure panel 24.

In order to accommodate movement between the fixed body panel 22 and the rotatable closure panel 24, the flexible conduit portion 16 can be constructed from an elastomeric material, such as EPDM. In addition, the flexible conduit portion 16 can be provided with a plurality of corrugations 28 to allow the flexible conduit portion 16 to bend as the closure panel 24 is rotated between the opened and closed positions. However, as the flexible conduit portion 16 bends, it may come into interference with the vehicle 12. For example, as the flexible conduit portion 16 bends, it can contact the body panel 22, the closure panel 24 or another part of the vehicle 12, such as a taillight 30. This contact can cause the corrugations 28 to catch on the vehicle 12, constraining the movement of the flexible conduit portion 16 and causing wear to the grommet 10. In order to prevent the corrugations 28 from catching on the vehicle 12, a longitudinally extending body contact segment 32 of the flexible conduit portion 16 can include a body contact portion 34 that is smooth relative to the corrugations 28.

Figure 5:
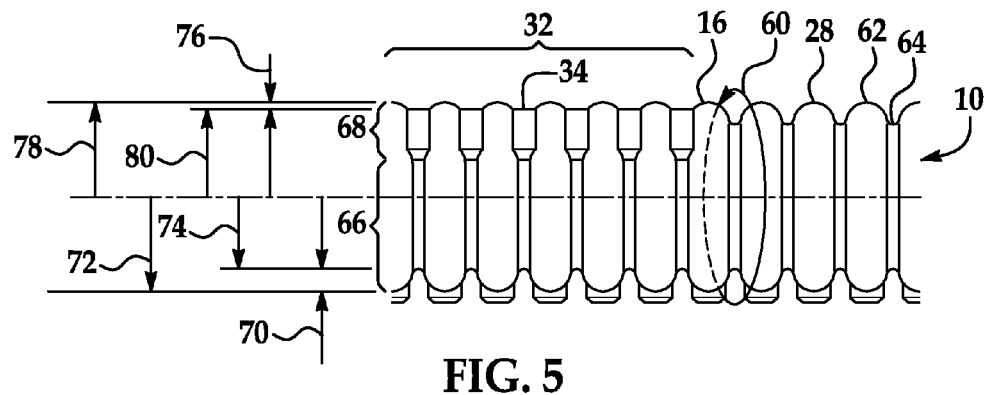
FIG. 5 is an enlarged view of a wiring grommet showing an aspect of a body contact portion.

FIG. 5 is an enlarged view of a section of the body contact segment 32 of the wiring grommet 10. The flexible conduit portion 16 has a nominal circumference 60 and includes a plurality of corrugations 28 on the exterior surface. The corrugations 28 are comprised of alternating adjacent ridges 62 and valleys 64. Although the ridges 62 and valleys 64 are shown as forming a continuous and generally sinusoidal surface, the ridges 62 and valleys 64 could alternatively form a surface simulating a square wave or a triangular wave, for example, or any other surface that provides a desired flexibility and durability to the flexible conduit portion 16.

The body contact segment 32 of the flexible conduit portion 16 includes a plurality of circumferential portions 66 and 68. As shown in FIG. 5, both the first circumferential portion 66 and the second circumferential portion 68 include a plurality of corrugations 28. The first circumferential portion 66 has a corrugated surface, with the ridges having a first ridge height 70 defined by the difference between a first ridge radius 72 and a first valley radius 74. The second circumferential portion 68 also has a corrugated surface, with the ridges having a second ridge height 76 defined by the difference between a second ridge radius 78 and a second valley radius 80. Additional material is included in the valleys of the second circumferential portion 68 such that the second ridge height 76 is less than the first ridge height 70. Alternatively, the second ridge height 76 can be made to be less than the first ridge height 70 by reducing the second ridge radius 78, or by the combination of reducing the second ridge radius 78 and including additional material in the valleys of the second circumferential portion 68.

Because the second ridge height 76 is less than the first ridge height 70, the second circumferential portion 68 is smooth relative to the first circumferential portion 66. When the grommet 10 is attached between the body panel 22 and the closure panel 24, as shown in FIG. 3, the second circumferential portion 68 forms the body contact portion 34 and is oriented along the circumference 60 of the body contact segment 32 such that it substantially faces the vehicle 12. If the body contact segment 32 contacts the vehicle 10, the second circumferential portion 68 allows for free movement of the flexible conduit portion 16 along the vehicle 12, reducing wear to the grommet 10. Further, the additional material provides enhanced durability to the flexible conduit portion 16 along the body contact segment 32.

Figure 6:
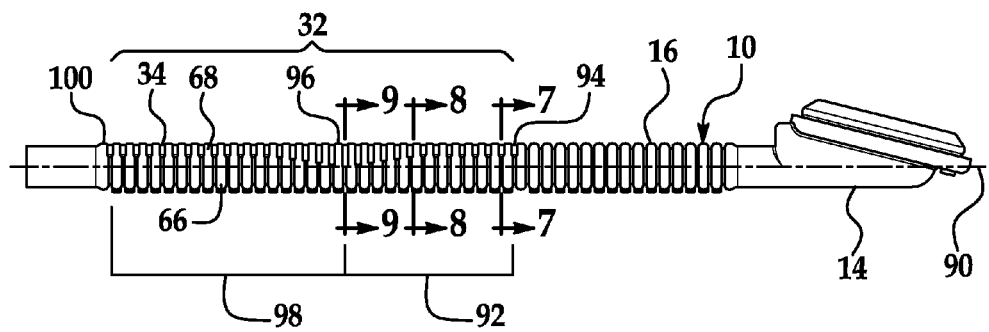
FIG. 6 is a side elevation view of a wiring grommet showing an aspect of a body contact portion.
Figure 7:
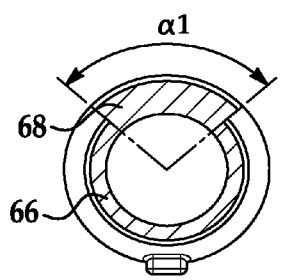
FIG. 7 is a cross section of the body contact portion of FIG. 6 taken along the line 7-7.
Figure 8:
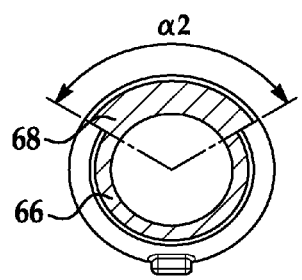
FIG. 8 is a cross section of the body contact portion of FIG. 6 taken along the line 8-8.
Figure 9:
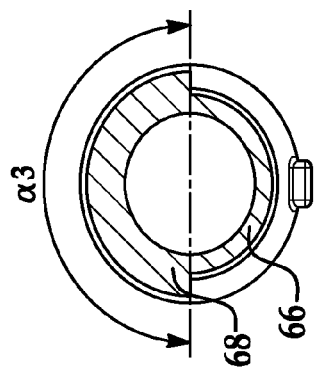
FIG. 9 is a cross section of the body contact portion of FIG. 6 taken along the line 9-9.

FIG. 6 shows the flexible conduit portion 16 of the wiring grommet 10 extending along a longitudinal axis 90. As illustrated in FIG. 6, the second circumferential portion 68 of the body contact segment 32 can wrap circumferentially around the circumference 60 of the body contact segment 32 at an angle that varies along the longitudinal axis 90. The body contact segment 32 includes a first longitudinally extending portion 92 extending from a first end 94 to a middle 96 and a second longitudinally extending portion 98 extending from the middle 96 to a second end 100. The second circumferential portion 68 wraps circumferentially at a continuously increasing angle from the first end 94 to the middle 96 along the first longitudinally extending portion 92. As shown in FIG. 7, the second circumferential portion 68 wraps circumferentially around the circumference 60 of the body contact segment 32 at an angle $\alpha 1$ at the first end 94. As shown in FIG. 8, the second circumferential portion 68 wraps circumferentially at an angle $\alpha 2$ that is larger than $\alpha 1$ at a point along the first longitudinally extending portion 92 between the first end 94 and the middle 96. As shown in FIG. 9, the second circumferential portion 68 can wrap circumferentially at an angle $\alpha 3$ at the middle 96, with $\alpha 3$ being larger than $\alpha 2$. The second circumferential portion 68 can then wrap circumferentially at a continuously decreasing angle from the middle 96 to the second end 100 along the second longitudinally extending portion 98.

In FIG. 6, the second circumferential portion 68 wraps circumferentially around less than the full circumference of the body contact segment 32, wrapping at a maximum angle $\alpha 3$ at the middle 96. In addition, the second circumferential portion 68 wraps circumferentially at varying angles along the longitudinal axis 90 such that the second circumferential portion 68 has a generally bell-shaped profile. Angle $\alpha 1$ can be selected to ensure that the second circumferential portion 68 adequately allows for free movement of the flexible conduit portion 16 along the vehicle 12. Angle $\alpha 1$ is shown as approximately 120°, but can be any angle depending upon the specific configuration of the vehicle 12 and the orientation of the grommet 10 with respect to the body panel 22, the closure panel 24 or another part of the vehicle 12 that the flexible conduit portion 16 can contact as it bends. Further, while the addition of material along the second circumferential portion 68 enhances the durability of the flexible conduit portion 16 along the body contact segment 32, it also increases the stiffness. Angle α3 can be selected so that the flexible conduit 16 maintains a desired flexibility along the body contact segment 32. Angle α3 is shown as approximately 180°, but can be any angle depending upon the specific flexibility requirements along or near the body contact segment 32.

The generally bell-shaped profile of the second circumferential portion 68 is formed by continuously increasing the angle of the second circumferential portion 68 from the first end 94 to the middle 96 along the first longitudinally extending portion 92 and by continuously decreasing the angle of the second circumferential portion 68 from the middle 96 to the end 100 along the second longitudinally extending portion 98, with the value for the angle α2 selected to be between the values selected for α1 and α3. Angle α2 is shown as approximately 130°, but can be any desired angle. The addition of material to the second circumferential portion 68 increases the stiffness of the flexible conduit portion 16 along the body contact segment 32. The increased stiffness results in a larger bending curvature for the flexible conduit portion 16, which prevents components running through the grommet 10, such as electrical wiring 54, from being pinched as the flexible conduit 16 bends. The generally bell-shaped profile can also be configured to focus the point of curvature at a desired point along the longitudinal axis 90. For example, the point of curvature can be focused at the middle 96 of the body contact segment 32 when the second circumferential portion 68 wraps circumferentially at a maximum angle α3 at the middle 96.

The second circumferential portion 68 shown in FIG. 6 is provided by way of example only. The second circumferential portion 68 could alternatively wrap circumferentially at a constant angle, a varying angle or at any combination of a constant angle and varying angle along the longitudinal axis 90 to create a profile that achieves the desired flexibility, stiffness, durability and bending characteristics for the flexible conduit portion 16.

Figure 10:
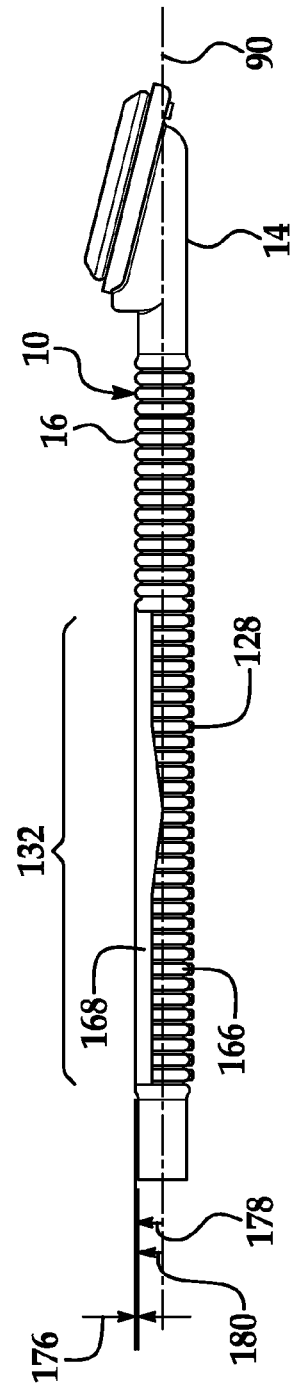
FIG. 10 is a side elevation view of a wiring grommet showing an alternative aspect of a body contact portion.

FIG. 10 shows an alternative aspect of a body contact segment 132. The body contact segment 132 includes circumferential portions 166 and 168. The first circumferential portion 166 includes a plurality of corrugations 128, while the second circumferential portion 168 is substantially flat along a longitudinal direction of the body contact segment 132. The second circumferential portion 168 can be constructed, for example, by including additional material in the valleys of the second circumferential portion 168 similar to what is shown in FIG. 5 such that the second ridge height 176, calculated as the distance between the second ridge radius 178 and the second valley radius 180, is substantially zero. Alternatively, the second circumferential portion 168 can be integrated into the body contact segment 132 through a molding process.

Figure 11:
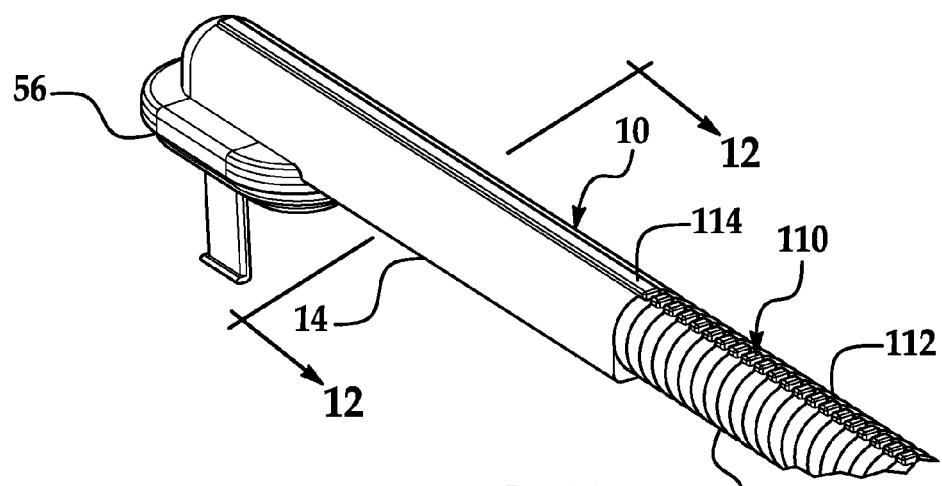
FIG. 11 is a perspective view of a wiring grommet showing an aspect of a flexible conduit portion and a mounting portion.

FIG. 11 is shows an aspect of a mounting portion 14 formed continuously with an end of a flexible conduit portion 16. The mounting portion 14 includes an annular flange 56 configured for attachment to a vehicle panel 50. The flexible conduit portion 16 includes an indicating structure 110. The indicating structure 110 provides a visual indication of a correct installation orientation for the grommet 10. For example, the indicating structure 110 can extend longitudinally along the flexible conduit portion 16. When the grommet 10 is installed on a vehicle 12, any twisting of the grommet 10 will be indicated by a corresponding twisting of the indicating structure 110. In addition to preventing twisting of the grommet 10 during installation, the indicating structure also ensures correct orienting of a body contact segment 32 of the flexible conduit portion 16 with a vehicle 12, as illustrated in FIG. 3. The indicating structure 110 is shown in FIG. 11 as including a plurality of longitudinally aligned radial projections 112 projecting from at least a plurality of the ridges 62 of the flexible conduit portion 16. The indicating structure 110 could alternatively include a plurality of longitudinally aligned radial projections 112 projecting from the valleys 64 of the flexible conduit portion 16, or could include a continuous rib formed on a periphery of the flexible conduit portion 16. The indicating structure 110 can further include a rib 114 extending longitudinally along the mounting portion 14 in longitudinal alignment with the radial projections 112.

Figure 12:
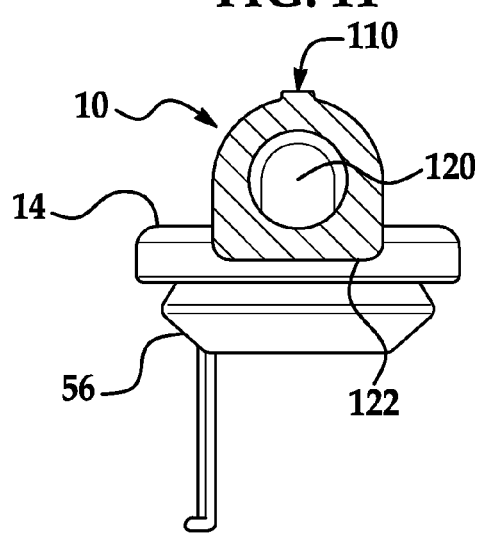
FIG. 12 is a cross section of the mounting portion of FIG. 11 taken along the line 12-12.
Figure 13:
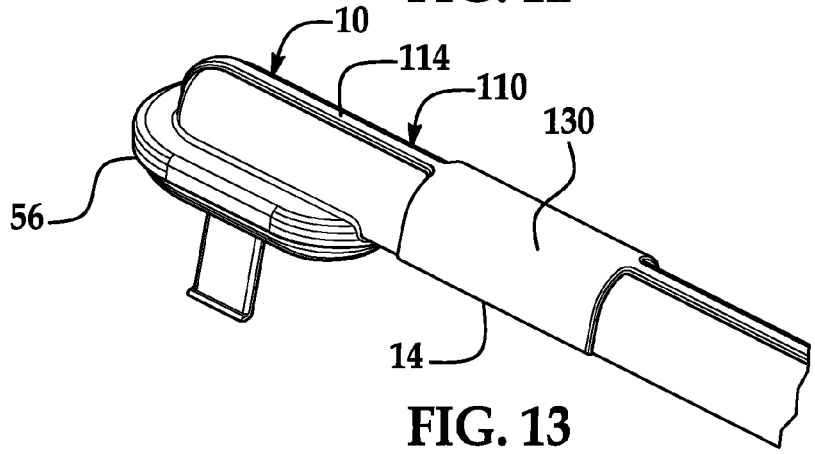
FIG. 13 is a perspective view of a wiring grommet showing an alternative aspect of a mounting portion.

FIG. 12 is a cross section of the mounting portion 14 of FIG. 11 taken along the line 12-12. The mounting portion 14 defines an aperture 120 that provides a passageway for components running through the grommet 10. The mounting portion also includes a substantially flat panel contact portion 122. FIG. 13 shows an alternative aspect of a mounting portion 14 that includes an integral reinforcing collar 130 to increase the rigidity of the mounting portion 14. When the grommet 10 is attached to a vehicle panel 50, such as the body panel 22 or the closure panel 24, the combination of the panel contact portion 122 and reinforcing collar 130 maintain the mounting portion 14 flat against the panel 50 and in a correct radial orientation with respect to the pass through aperture 52 as the flexible conduit portion 16 bends and applies force to the mounting portion 14.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An electrical wiring grommet comprising: a body mounting portion; a closure panel mounting portion; and a flexible conduit portion extending between the body mounting portion and the closure panel mounting portion and comprising a longitudinally extending body contact segment having a circumference, the circumference having a first circumferential portion and a second circumferential portion, wherein: the first circumferential portion includes a corrugated surface having a plurality of ridges with a first ridge height; and the second circumferential portion is less than a full circumference of the body contact segment and includes a corrugated surface having a plurality of ridges with a second ridge height less than the first ridge height.

2. The electrical wiring grommet of claim 1 wherein the second ridge height is substantially zero.

3. The electrical wiring grommet of claim 1, wherein:
   each of the plurality of ridges in the first circumferential portion has a first ridge radius and is adjacent to a valley having a first valley radius, the first ridge height being defined by a difference between the first ridge radius and the first valley radius; and
   each of the plurality of ridges in the second circumferential portion has a second ridge radius and is adjacent to a valley having a second valley radius, the second ridge height being defined by a difference between the second ridge radius and the second valley radius.

4. The electrical wiring grommet of claim 1 wherein the second circumferential portion is between 120° and 180° of the circumference of the body contact segment.

5. The electrical wiring grommet of claim 4 wherein:
the second circumferential portion includes a plurality of longitudinally extending portions, the plurality of longitudinally extending portions varying between 120° and 180° of the circumference of the body contact segment.

6. The electrical wiring grommet of claim 4 wherein the second circumferential portion includes a first end opposing a second end with a middle between the first and second ends extending along a longitudinal axis, and wherein the second circumferential portion is 120° of the circumference at the first and second ends, continuously increases between 130° and 180° of the circumference from the first end to the middle and continuously decreases between 180° and 130° of the circumference from the middle to the second end.

7. The electrical wiring grommet of claim 1 further comprising a longitudinally extending indicating structure included in at least the flexible conduit portion.

8. The electrical wiring grommet of claim 7 wherein the indicating structure extends continuously along the body mounting portion, the closure panel mounting portion and the flexible conduit portion.

9. The electrical wiring grommet of claim 8 wherein the indicating structure includes a plurality of longitudinally aligned radial projections.

10. An electrical wiring pass-through structure for a vehicle comprising: a body panel defining a body panel pass through aperture; a closure panel defining a closure panel pass through aperture; and an electrical wiring grommet comprising: a body mounting portion overlaying the body panel pass through aperture; a closure panel mounting portion overlaying the closure panel pass through aperture; and a flexible conduit portion extending between the body mounting portion and the closure panel mounting portion and comprising a longitudinally extending body contact segment, the body contact segment having a circumference that has a first circumferential portion and a second circumferential portion, wherein: the first circumferential portion includes a corrugated surface having a plurality of ridges with a first ridge height; and the second circumferential portion is less than a full circumference of the body contact segment and includes a corrugated surface having a plurality of ridges with a second ridge height less than the first ridge height.

11. The electrical wiring pass-through structure of claim 10 wherein the second ridge height is substantially zero.

12. The electrical wiring pass-through structure of claim 10, wherein:
each of the plurality of ridges in the first circumferential portion has a first ridge radius and is adjacent to a valley having a first valley radius, the first ridge height being defined by a difference between the first ridge radius and the first valley radius; and
each of the plurality of ridges in the second circumferential portion has a second ridge radius and is adjacent to a valley having a second valley radius, the second ridge height being defined by a difference between the second ridge radius and the second valley radius.

13. The electrical wiring pass-through structure of claim 10 wherein the second circumferential portion is between 120° and 180° of the circumference of the body contact segment.

14. The electrical wiring pass-through structure of claim 13 wherein:
the second circumferential portion includes a plurality of longitudinally extending portions varying between 120° and 180° of the circumference along the second longitudinally extending portion.

15. The electrical wiring pass-through structure of claim 13 wherein:
the second circumferential portion includes a first end opposing a second end with a middle between the first and second ends and wherein the second circumferential portion is 120° of the circumference at the first and second ends, at a continuously increasing angle varying between 130° and 180° of the circumference from the first end to the middle and at a continuously decreasing angle varying between 180° and 130° of the circumference from the middle to the second end.

16. The electrical wiring pass-through structure of claim 10 further comprising a longitudinally extending indicating structure included in at least the flexible conduit portion.

17. The electrical wiring pass-through structure of claim 16 wherein the indicating structure extends continuously along the body mounting portion, the closure panel mounting portion and the flexible conduit portion.

18. The electrical wiring pass-through structure of claim 16 wherein the indicating structure includes a plurality of longitudinally aligned radial projections.

19. An electrical wiring grommet comprising: a body mounting portion; a closure panel mounting portion; and a flexible conduit extending between the body mounting portion and the closure panel mounting portion, the flexible conduit comprising a body contact segment extending longitudinally along a partial length of the flexible conduit and having a circumference, the circumference having a first circumferential portion and a second circumferential portion, wherein: flexible conduit includes a plurality of alternating ridges and valleys forming a corrugated surface; and the second circumferential portion is 180° or less of the circumference and forms a body contact portion that is substantially flat along a longitudinal direction of the flexible conduit.

20. The electrical wiring grommet of claim 19 wherein the body contact portion varies between 120° and 180° of the circumference along the partial length of the flexible conduit to create a symmetric profile.

\* \* \* \* \*